United States Patent
Emami et al.

(10) Patent No.: US 11,492,434 B2
(45) Date of Patent: Nov. 8, 2022

(54) SHAPE MORPHING SOFT MATERIALS AND ASSEMBLIES INCLUDING THE SAME

(71) Applicants: Roozbeh Emami, Tempe, AZ (US); Yousif Alsaid, Los Angeles, CA (US); Ximin He, Los Angeles, CA (US); Daniel Aukes, Gilbert, AZ (US)

(72) Inventors: Roozbeh Emami, Tempe, AZ (US); Yousif Alsaid, Los Angeles, CA (US); Ximin He, Los Angeles, CA (US); Daniel Aukes, Gilbert, AZ (US)

(73) Assignees: Arizona Board of Regents on behalf of Arizona State University, Scottsdale, AZ (US); The Regents of the University of California, Oakland, CA (US)

( * ) Notice: Subject to any disclaimer, the term of this patent is extended or adjusted under 35 U.S.C. 154(b) by 54 days.

(21) Appl. No.: 16/900,441

(22) Filed: Jun. 12, 2020

(65) Prior Publication Data
US 2021/0284775 A1 Sep. 16, 2021

Related U.S. Application Data

(60) Provisional application No. 62/860,700, filed on Jun. 12, 2019.

(51) Int. Cl.
*C08F 220/56* (2006.01)

(52) U.S. Cl.
CPC .................. *C08F 220/56* (2013.01)

(58) Field of Classification Search
CPC .................................................... C08F 220/56
See application file for complete search history.

(56) References Cited

U.S. PATENT DOCUMENTS 10,794,029 B2   10/2020  He et al.
2015/0093823 A1* 4/2015  Sutton .................... C12M 25/02
                                                        435/375

FOREIGN PATENT DOCUMENTS

GB        2516484 A  *  1/2015  ............ B01J 20/264
KR    20170044421 A  *  4/2017

OTHER PUBLICATIONS

Li, Ang et al. Fabrication and testing of thermally responsive hydrogel-based actuators using polymer heater elements for flexible microvalves. (Feb. 2011) Proceedings of SPIE—The International Society for Optical Engineering 7929 (Year: 2011).*
Liu et al., "Multilayer hydrogels as muscle-like actuators," Advanced Materials, Feb. 23, 2000, 12(4):288-291.
Liu et al., "Thermoresponsive Semi-IPN Hydrogel Microfibers from Continuous Fluidic Processing with High Elasticity and Fast Actuation," ACS Applied Materials & Interfaces, Dec. 7, 2016, 9:901-908.
Luo et al., "A one-step hydrothermal route to programmable stimuli-responsive hydrogels," Chemical Communications, Mar. 4, 2015, 51(30):6617-6620.
Luo et al., "Gradient porous elastic hydrogels with shape-memory property and anisotropic responses for programmable locomotion," Advanced Functional Materials, 2015, 25(47):7272-7279.
Lv et al., "Sensitively Humidity-Driven Actuator Based on Photopolymerizable PEG-DA Films," Advanced Materials Interfaces, Feb. 15, 2017, 4(9): 1-8.
Ma et al., "A Multiresponsive Anisotropic Hydrogel with Macroscopic 3D Complex Deformations," Advanced Functional Materials, Oct. 26, 2016, 26(47):8670-8676.
Ma et al., "Supramolecular Lego Assembly Towards Three-Dimensional Multi-Responsive Hydrogels," Advanced Materials, Jun. 27, 2014, 26(32):5665-5669.
Ma et al., "Bioinspired Anisotropic Hydrogel Actuators with On-Off Switchable and Color-Tunable Fluorescence Behaviors," Advanced Functional Materials, Dec. 15, 2018, 28(7):1-7.
Meyers et al., "Biological materials: Structure and mechanical properties," Progress in Materials Science, Jan. 2008, 53(1): 1-206.
Moreno et al., "The effect of the solvent employed in the synthesis of hydrogels of poly (acrylamide-co-methyl methacrylate) on their structure, properties and possible biomedical applications," European Polymer Journal, Jan. 10, 2017, 88:148-160.
Mourran et al., "Soft Microrobots Employing Nonequilibrium Actuation via Plasmonic Heating," Advanced Materials, Nov. 7, 2016, 29(2): 1-8.
Nawroth et al., "A tissue-engineered jellyfish with biomimetic propulsion," Nature Biotechnology, Aug. 2012, 30(8):792-797.
Oh et al., "Control of Reversible Self-Bending Behavior in Responsive Janus Microstrips," ACS Applied Materials Interfaces, Mar. 14, 2016, 8(13):8782-8788.
Opdenbosch et al., "Passive and active mechanical properties of biotemplated ceramics revisited," Bioinspiration and Biomimetics, Oct. 13, 2016, 11(6):1-11.
Osada et al., "A polymer gel with electrically driven motility," Nature, Jan. 16, 1992, 355(6357):242-244.
Oxman, "Variable property rapid prototyping," Virtual Physical Prototyping, Mar. 2011, 6(1):3-31.
Pagan-Diaz et al., "Simulation and Fabrication of Stronger, Larger, and Faster Walking Biohybrid Machines," Advanced Functional Materials, 2018, 28(23):1-13.
Palagi et al., "Structured light enables biomimetic swimming and versatile locomotion of photoresponsive soft microrobots," Nature Materials, Feb. 15, 2016, 15(6):647-653.
Peng et al., "Thermoresponsive Deformable Actuators Prepared by Local Electrochemical Reduction of Poly (N-isopropylacrylamide)/Graphene Oxide Hydrogels," ACS Applied Nano Materials, Mar. 19, 2018, 1:1522-1530.

(Continued)

*Primary Examiner* — Sanza L. McClendon
(74) *Attorney, Agent, or Firm* — Fish & Richardson P.C.

(57) ABSTRACT

A hydrogel precursor composition includes 10 wt % to 40 wt % N-isopropylacrylamide, 0.5 wt % to 2 wt % N,N'-methylenebisacrylamide, a solvent, and a photoinitiator. The hydrogel precursor composition is photocurable and thermally responsive. A thermally responsive hydrogel is formed by photopolymerizing the hydrogel precursor composition. The thermally responsive hydrogel may be used to mimic the activity of muscle fibers.

13 Claims, 12 Drawing Sheets

(56) References Cited

OTHER PUBLICATIONS

Popescu et al., "Digital materials for digital printing," Society for Imaging Science and Technology, Jan. 1, 2006, 3 pages.
Richter et al., "Octopus arm movements under constrained conditions: adaptation, modification and plasticity of motor primitives," Journal of Experimental Biology, Apr. 1, 2015, 218(7): 1069-1076.
Richter et al., "Optoelectrothermic Control of Highly Integrated Polymer-Based MEMS Applied in an Artificial Skin," Advanced Materials, Feb. 23, 2009, 21(9):979-983.
Ricotti et al., "Biohybrid actuators for robotics: A review of devices actuated by living cells," Science Robotics, Nov. 29, 2017, 2(12):1-17.
Shen et al., "Remotely Triggered Locomotion of Hydrogel Magbots in Confined Spaces," Science Reports, Nov. 23, 2017, 7(16178):1-10.
Shi et al., "Actuator Based on MWNT / PVA Hydrogels," The Journal of Physical Chemistry Letters Biomolecules, Jul. 20, 2005, 109:14789-14791.
Shi et al., "Near-Infrared Light-Responsive Poly(N-isopropylacrylamide)/Graphene Oxide Nanocomposite Hydrogels with Ultrahigh Tensibility," ACS Applied Materials & Interfaces, Nov. 18, 2015, 7(49):27289-27298.
Shin et al., "Aligned Carbon Nanotube-Based Flexible Gel Substrates for Engineering Biohybrid Tissue Actuators," Advanced Functional Materials, Jun. 12, 2015, 25(28):4486-4495.
Shin et al., "Electrically Driven Microengineered Bioinspired Soft Robots," Advanced Materials, Jan. 11, 2018, 30(10):1-13.
Stoychev et al., "Hole-Programmed Superfast Multistep Folding of Hydrogel Bilayers," Advanced Functional Materials, Sep. 8, 2016, 26(42):7733-7739.
Stuart et al., "Emerging applications of stimuli-responsive polymer materials," Nature Materials, Jan. 22, 2010, 9:101-113.
Sun et al., "Highly stretchable and tough hydrogels," Nature, Sep. 6, 2012, 489(7414):133-136.
Takashima et al., "A Photoresponsive Polymeric Actuator Topologically Cross-Linked by Movable Units Based on a [2] Rotaxane," Jun. 14, 2018, 51:4688-4693.
Rogoz et al., "Light-Driven Soft Robot Mimics Caterpillar Locomotion in Natural Scale," Advanced Optical Materials, Aug. 12, 2016, 4(11):1689-1694.
Tokudome et al., "Thermoresponsive Wrinkles on Hydrogels for Soft Actuators," Advanced Materials Interfaces, Feb. 22, 2016, 3(12):1-5.
Tokuyama et al., "Porous poly(N-isopropylacrylamide) gels polymerized in mixed solvents of water and N,N-dimethylformamide," Polymer Bulletin, Jun. 27, 2008, 61:399-405.
Wang et al., "Light-Controlled Graphene-Elastin Composite Hydrogel Actuators," May 6, 2013, 13:2826-2830.
Wang et al., "Soft Ultrathin Electronics Innervated Adaptive Fully Soft Robots," Advanced Materials, Feb. 5, 2018, 30(13):1-9.
Wang et al., "Random copolymer gels of N-isopropylacrylamide and N-ethylacrylamide: effect of synthesis solvent compositions on their properties," Royal Society of Chemistry Advances, Jan. 30, 2017, 7:9381-9392.
Wang et al., "Bioinspired Smart Actuator Based on Graphene Oxide-Polymer Hybrid Hydrogels," ACS Applied Materials Interfaces, Oct. 8, 2015, 7(42):23423-23430.
Wang et al., "Tunable, Fast, Robust Hydrogel Actuators Based on Evaporation—Programmed Heterogeneous Structures," Oct. 27, 2017, 29:9793-9801.
Wang et al., "A facile, robust and versatile finite element implementation to study the time-dependent behaviors of responsive gels," Extreme Mechanics Letters, Jun. 5, 2018, 22:89-97.
Wu et al., "Synthesis and characterization of thermally reversible macroporous poly(N-isopropylacrylamide) hydrogels," Journal of Polymer Science: Part A: Polymer Chemistry, Sep. 1992, 30(10):2121-2129.
Wu et al., "Three-dimensional shape transformations of hydrogel sheets induced by small-scale modulation of internal stresses," Nature Communications, Mar. 12, 2013, 4(1586):1-7.
Xia et al., "Nano-structured smart hydrogels with rapid response and high elasticity," Nature Communication, Jul. 31, 2013, 4:1-11.
Xiao et al., "Salt-Responsive Bilayer Hydrogels with Pseudo-Double-Network Structure Actuated by Polyelectrolyte and Antipolyelectrolyte Effects," ACS Applied Materials & Interfaces, Jun. 1, 2017, 9:20843-20851.
Xiao et al., "Dual Salt- and Thermo-Responsive Programmable Bilayer Hydrogel Actuators with Pseudo-Interpenetrating Double-Network Structures," ACS Applied Materials & Interfaces, Jun. 7, 2018, 10:21642-21653.
Xu et al., "Low-voltage switching of crease patterns on hydrogel surfaces," Advanced Materials, Jul. 22, 2013, 25(39):5555-5559.
Yang et al., "Photothermal Nanocomposite Hydrogel Actuator with Electric-Field-Induced Gradient and Oriented Structure,"ACS Applied Materials & Interfaces, Jan. 24, 2018, 10:7688-7692.
Yang et al., "Highly Elastic and Ultratough Hybrid Ionic-Covalent Hydrogels with Tunable Structures and Mechanics," Advanced Materials, Mar. 25, 2018, 30(18):1-9.
Yao et al., "Poly(N-isopropylacrylamide)-clay nanocomposite hydrogels with responsive bending property as temperature-controlled manipulators," Advanced Functional Materials, Apr. 9, 2015, 25(20):2980-2991.
Yao et al., "Smart Hydrogels with Inhomogeneous Structures Assembled Using Nanoclay-Cross-Linked Hydrogel Subunits as Building Blocks," ACS Applied Materials & Interfaces, Aug. 4, 2016, 8:21721-21730.
Yeghiazarian et al., "Directed Motion and Cargo Transport Through Propagation of Polymer-Gel Volume Phase Transitions," Advanced Materials, May 25, 2005, 17: 1869-1873.
Yu et al., "Electronically programmable, reversible shape change in two- and three-dimensional hydrogel structures," Advanced Material, Dec. 19, 2012, 25(11): 1541-1546.
Yuan et al., "3D Printed Active Origami with Complicated Folding Patterns," International Journal of Precision Engineering and Manufacturing-Green Technology, Jul. 2017, 4(3):281-289.
Zhang et al., "Gel integration for microfluidic applications," Lab Chip, Apr. 18, 2016, 16(10): 1757-1776.
Zhang et al., "Using mixed solvent to synthesize temperature sensitive poly(N-isopropylacrylamide) gel withrapid dynamics properties," Biomaterials, 2002, 23:1313-1318.
Zhang et al., "Strategies to improve the response rate of thermosensitive PNIPAAm hydrogels," Soft Matter, 2008, 4(3):385-391.
Zhao et al., "Programmable and Bidirectional Bending of Soft Actuators Based on Janus Structure with Sticky Tough PAA-Clay Hydrogel," Mar. 14, 2017, 9:11866-11873.
Zhao et al., "Hydrophilic / Hydrophobic Composite Shape-Shifting Structures," ACS Applied Materials & Interfaces, May 8, 2018, 10:19932-19939.
Zhao et al., "Bionic intelligent hydrogel actuators with multimodal deformation and locomotion," Nano Energy, Sep. 2018, 51:621-631.
Zheng et al., "Tough Al-alginate / Poly ( N-isopropylacrylamide ) Hydrogel with Tunable LCST for Soft Robotics," ACS Applied Materials & Interfaces, Jan. 5, 2015, 7:1758-1764.
Zheng et al., "Programmed Deformations of 3D-Printed Tough Physical Hydrogels with High Response Speed and Large Output Force," Advanced Functional Materials, Jul. 27, 2018, 28(37): 1-8.
Zhou et al., "Mechanochemical Regulated Origami with Tough Hydrogels by Ion Transfer Printing," ACS Materials & Interfaces, Feb. 21, 2018, 10:9077-9084.
Zong et al., "Activation of Actuating Hydrogels with WS2 Nanosheets for Biomimetic Cellular Structures and Steerable Prompt Deformation," ACS Applied Materials & Interfaces, Aug. 22, 2017, 9:32280-32289.
Annabi et al., "25th Anniversary Article: Rational Design and Applications of Hydrogels in Regenerative Medicine," Advanced Materials, Jan. 8, 2014, 26(1):85-124.
Banerjee et al., "Hydrogel Actuators and Sensors for Biomedical Soft Robots: Brief Overview with Impending Challenges," Biomimetics, Jul. 10, 2018, 3(15): 1-14.

(56) References Cited

OTHER PUBLICATIONS

Bertassoni et al., "Direct-write bioprinting of cell-laden methacrylated gelatin hydrogels," Biofabrication, Apr. 3, 2014, 6(2):1-11.
Bin Imran et al., "Recent advances in hydrogels in terms of fast stimuli responsiveness and superior mechanical performance," Polymer Journal, Sep. 29, 2010, 42:839-851.
Breger et al., "Self-Folding Thermo-Magnetically Responsive Soft Microgrippers," ACS Applied Materials & Interfaces, Jan. 16, 2015, 7:3398-3405.
Chen et al., "Synthesis of superporous hydrogels: Hydrogels with fast swelling and superabsorbent properties," Journal of Biomedical Materials Research, Jan. 3, 1999, 44(1):53-62.
Chen et al., "Combining 3D Printing with Electrospinning for Rapid Response and Enhanced Designability of Hydrogel Actuators," Advanced Functional Materials, Mar. 15, 2018, 28(19):1-7.
Cheney et al., "Unshackling Evolution: Evolving Soft Robots with Multipled Materials and a Powerful Generative Encoding," ACM SIGEVOlution, Aug. 2014, 7(1):11-23.
D'Eramo et al., "Microfluidic actuators based on temperature-responsive hydrogels," Microsystems & Nanoengineering, Jan. 1, 2018, 4(17069):1-7.
Deng et al., "Tunable Photothermal Actuators Based on a Preprogrammed Aligned Nanostructure," Journal of the American Chemical Society, Dec. 17, 2015, 138:225-230.
Erb et al., "Self-shaping composites with programmable bioinspired microstructures," Nature Communications, Apr. 16, 2013, 4(1712):1-8.
Erol et al., "Transformer Hydrogels: A Review," Advanced Materials Technologies, Feb. 27, 2019, 4(1900043):1-27.
Feng et al., "Effects of synthesis-solvent on characteristics of poly(N-isopropylacrylamide) hydrogels synthesized by Frontal Polymerization," Advanced Material Research, Jul. 4, 2011, 295-297:1193-1197.
Fratzl et al., "Nature's hierarchical materials," Progress in Materials Science, Nov. 2007, 52(8):1263-1334.
Gong et al., "pH- and Thermal-Responsive Multishape Memory Hydrogel," ACS Applied Materials & Interfaces, Sep. 19, 2016, 8:27432-27437.
Gonzalez et al., "Strong, Tough, Stretchable, and Self-Adhesive Hydrogels from Intrinsically Unstructured Proteins," Advanced Materials, Jan. 6, 2017, 29(1604743):1-8.
Goy et al., "Microfluidics and hydrogel: A powerful combination," Reactive and Fuctional Polymers, Jul. 3, 2019, 145(104314):1-14.
Greene et al., "Redox-Responsive Artificial Molecular Muscles: Reversible Radical-Based Self-Assembly for Actuating Hydrogels," Chemistry of Materials, Oct. 16, 2017, 29:9498-9508.
Han et al., "Soft Robotic Manipulation and Locomotion with a 3D Printed Electroactive Hydrogel," ACS Applied Materials & Interfaces, May 9, 2018, 10:17512-17518.
Hanassy et al., "Stereotypical reaching movements of the octopus involve both bend propagation and arm elongation," Bioinspiration & Biomimetics, May 13, 2015, 10(035001):1-19.
Hiller et al., "Design and analysis of digital materials for physical 3D voxel printing," Rapid Prototyping Journal, 2009, 15(2):137-149.
Hiller et al., "Tunable digital material properties for 3D voxel printers," Rapid Prototyping Journal, Jun. 15, 2010, 16(4):241-247.
Hiller et al., "Automatic design and manufacture of soft robots," IEEE Transaction Robotics, Apr. 2012, 28(2):457-466.
Hu et al., "Small-scale soft-bodied robot with multimodal locomotion," Nature, Feb. 1, 2018, 554(7690):81-85.
Hu et al., "Reversible Modulation of DNA-Based Hydrogel Shapes by Internal Stress Interactions," Journal of American Chemical Society, Nov. 16, 2016, 138:16112-16119.
Huang et al., "Ultrafast Digital Printing toward 4D Shape Changing Materials," Advanced Materials, 2017, 29(1605390):1-6.
Ionov, "Hydrogel-based actuators: possibilities and limitations," Materials Today, Dec. 2014, 17(10):494-503.
Iwaso et al., "Fast response dry-type artificial molecular muscles with [c2]daisy chains," Nature Chemistry, May 9, 2016, 8(6):625-632.
Jiang et al., "Unusual and Superfast Temperature-Triggered Actuators," Advanced Materials, Jul. 16, 2015, 27(33):4865-4870.
Juluri et al., "A Mechanical Actuator Driven Electrochemically by Artificial Molecular Muscles," ACS Nano, Jan. 30, 2009, 3(2):291-300.
Kaufman et al., "Volume Graphics," Computer, Jul. 1993, 26(7):51-64.
Kazakidi et al., "CFD study of aquatic thrust generation by an octopus-like arm under intense prescribed deformations," Computers Fluids, Mar. 20, 2015, 115:54-65.
Kier et al., "Biochemical comparison of fast-and slow-contracting squid muscle," Journal of Experimental Biology, Jul. 1992, 168(1):41-56.
Kier, "Tongues, tentacles and trunks: the biomechanics of movement in muscular-hydrostats," Zoological Journal of the Linnean Society, 1985, 83:307-324.
Kim et al., "Fast low-voltage electroactive actuators using nanostructured polymer electrolytes," Nature Communication, Jul. 30, 2013, 4(2208):1-9.
Kim et al., "Programmable Volume Phase Transition of Hydrogels Achieved by Large Thermal Hysteresis for Static-Motion Bilayer Actuators," Chemistry of Materials, Nov. 18, 2016, 28:8807-8814.
Kim et al., "Thermoresponsive actuation enabled by permittivity switching in an electrostatically anisotropic hydrogel," Nature Materials, Aug. 10, 2015, 14(10):1002-1007.
Kong et al., "Muscle-Inspired Highly Anisotropic, Strong, Ion-Conductive Hydrogels," Advanced Materials, Sep. 26, 2018, 30(39): 1-7.
Le et al., "Recent Progress in Biomimetic Anisotropic Hydrogel Actuators," Advanced Science, Jan. 15, 2019, 6(5):1-14.
Lee et al., "Novel Hydrogel Actuator Inspired by Reversible Mussel Adhesive Protein Chemistry," Advanced Materials, Mar. 4, 2014, 26(21):3415-3419.
Lee et al., "Thermoreversible Hydrogels. XII. Effect of the Polymerization Conditions on the Swelling Behavior of the N-Isopropylacrylamide Gel," Journal of Applied Polymer Science, Sep. 18, 2000, 78(9): 1604-1611.
Lee et al., "Rapid Accessible Fabrication and Engineering of Bilayered Hydrogels: Revisiting the Cross-Linking Effect on Superabsorbent Polyacrylic acid)," ACS Omega, Mar. 14, 2018, 3(3):3096-3103.
Li et al., "A Fast Rolling Soft Robot Driven by Dielectric Elastomer," IEEE/ASME Transaction Mechatronics, Aug. 2018, 23(4): 1630-1640.
Li et al., "Understanding and controlling the self-folding behavior of poly (N-Isopropylacrylamide) microgel-based devices," Advanced Functional Materials, Apr. 1, 2014, 24(26):4119-4126.
Liang et al., "Multiresponsive Kinematics and Robotics of Surface-Patterned Polymer Film," ACS Applied Materials & Interfaces, May 14, 2018, 10(22):19123-19132.
Liu et al., "Enhanced protective role in materials with gradient structural orientations: Lessons from Nature," Acta Biomaterialia, Aug. 5, 2016, 44:31-40.
Liu et al., "Functional gradients and heterogeneities in biological materials: Design principles, functions, and bioinspired applications," Progress in Materials Science, Apr. 25, 2017, 88:467-298.
Liu et al., "Electroresponsive Homogeneous Polyelectrolyte Complex Hydrogels from Naturally Derived Polysaccharides," ACS Sustainable Chemistry & Engineering, Apr. 11, 2018, 6(5):7052-7063.
Liu et al., "Giving Direction to Motion and Surface with Ultra-Fast Speed Using Oriented Hydrogel Fibers," Advaced Functional Materials, Dec. 28, 2015, 26(7):1021-1027.
Liu et al., "Linear Artificial Molecular Muscles," Journal of American Chemical Society, Jun. 15, 2005, 127:9745-9759.

\* cited by examiner

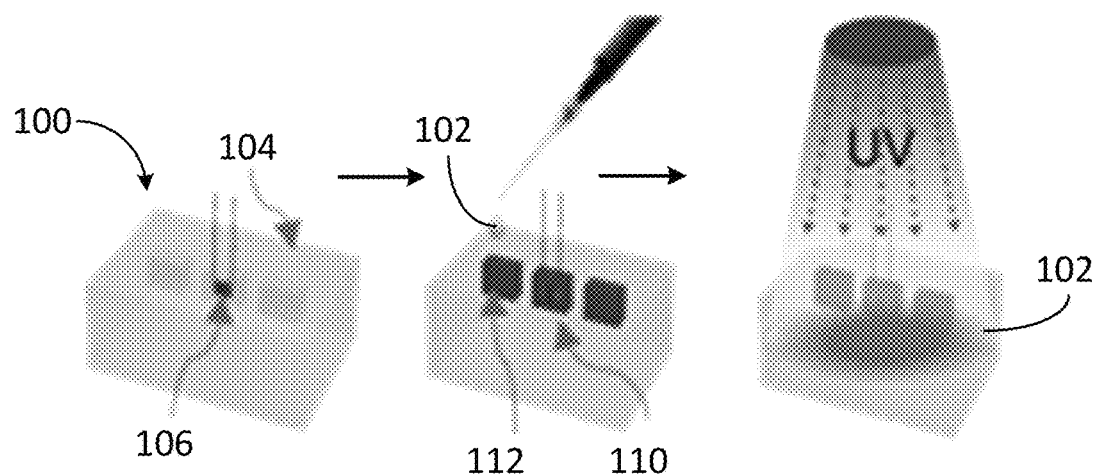
FIG. 1
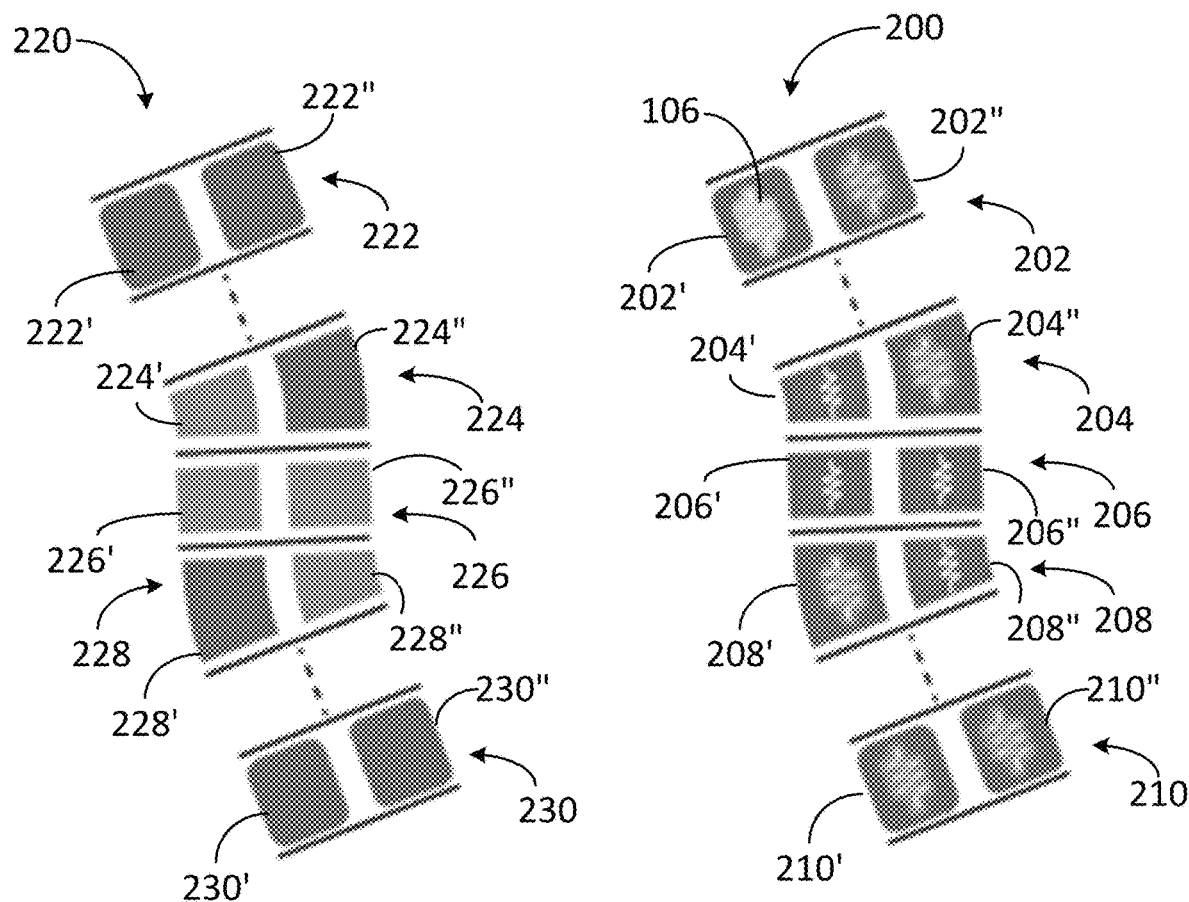
FIG. 2A
FIG. 2B

SHAPE MORPHING SOFT MATERIALS AND ASSEMBLIES INCLUDING THE SAME

CROSS-REFERENCE TO RELATED APPLICATION

This application claims the benefit of U.S. Patent Application No. 62/860,700 entitled "SHAPE MORPHING SOFT MATERIAL" and filed on Jun. 12, 2019, which is incorporated by reference herein in its entirety.

STATEMENT OF GOVERNMENT SUPPORT

This invention was made with government support under N00014-17-1-2117 awarded by the Office of Naval Research. The government has certain rights in the invention.

TECHNICAL FIELD

This invention relates to shape morphing or muscle-mimicking adaptive materials and assemblies including the same.

BACKGROUND

Adaptive tissue that can tune properties such as shape, color, and stiffness are widely seen in living organisms. These "living materials" are well-tuned from millions of years of evolution to serve niche roles. It is therefore not surprising that living materials and organisms outperform artificial materials (and the resulting engineered devices) in many respects. Muscle tissue can be considered one of the most sophisticated adaptive mechanical materials in nature. Not only can it change its shape and stiffness while producing force and motion, but it can also tune these parameters in a precise manner in conjunction with the brain and nervous system.

With the increasing demand on soft robots, developing artificial soft actuators with the same level of complexity as muscle tissue in living organisms is highly favorable. A variety of actuators have been proposed. However, these actuators are typically not adaptive, which means the motion of these actuators are programmed in their structure and cannot be changed after manufacturing. Moreover, these actuators have not demonstrated viability for use as building blocks for hierarchical, adaptive, soft systems, mainly because they are not designed with a hierarchical design strategy in mind: they either bypass the hierarchy and miss important details or start at a very low level such that integration is not viable with current technology. Practical soft robotic applications having localized and time-varying deformations of responsive hydrogels have been difficult to realize.

SUMMARY

This disclosure relates to muscle-mimicking adaptive material. This material is constructed using a bottom-up approach and includes soft voxel units made of newly developed thermally responsive hydrogels that are electronically addressable via embedded resistive joule heaters. Adjusting the chemical composition of the gel allows faster thermal and mass diffusion across the bulk of the material and thus a faster response. The procedure for preparing this gel reveals information about poly(N-isopropylacrylamide) (NIPAAM)-based hydrogels that approximates the mechanisms behind the fast response of the gels. Moreover, this gel shows temperature-dependent swelling ratio behavior.

A hierarchical design strategy has been adopted and implemented using the concept of digital materials. This strategy facilitates the design and manufacture of larger, more complex structures with similarly more complex behavior. Using the combined advantages of highly responsive materials in conjunction with this design approach leads to programmable materials that mimic the behavior of soft muscle tissue at different levels, from sarcomere to the larger bundles of muscle fibers. This approach allows for controlling many degrees of freedom in the material to create complex motion trajectories.

Materials, systems, and methods for facile manufacturing of heterogeneous hydrogel structures with programmable spatiotemporal deformations are described. This technique involves an optimized mixed solvent photopolymerization method which enables mass production of voxels—building blocks of temperature-responsive hydrogels—and tuning their material properties in a simple, one-step casting method. Complex deformation in structures are achieved using hard-coded deformations by determining the location and swelling properties of each voxel and software-programmable deformations by assembling addressable voxels containing an embedded Joule heater.

To demonstrate the robustness of voxel-based techniques in facile manufacturing of soft structures with programmable deformations, two soft arms are generated that can grasp a cargo and transport it in two different paths based on their hardcoded voxel arrangement. In addition, using addressable voxels, a soft arm is made capable of working in unstructured environments by modifying its shape on-demand.

In a first general aspect, a hydrogel precursor composition includes 10 wt % to 40 wt % N-isopropylacrylamide, 0.5 wt % to 2 wt % N,N'-methylenebisacrylamide, a solvent, and a photoinitiator. The hydrogel precursor composition is photocurable and thermally responsive.

Implementations of the first general aspect may include one or more of the following features.

The solvent includes water, and may further include dimethyl sulfoxide. A ratio of the volume of the water to the total amount of solvent is typically in a range of 0 to 0.8 or 0.1 to 0.6. In one example, the photoinitiator is 2-hydroxy-2-methylpropiophenone. The hydrogel precursor composition is curable under ultraviolet light to yield a cured hydrogel.

In a second general aspect, a voxel includes a hydrogel formed from the hydrogel precursor composition the first general aspect, a heater embedded in the cured hydrogel.

In a third general aspect, fabricating a voxel includes providing the hydrogel precursor composition of the first general aspect to a mold configured to receive a fluid, positioning a heater in the hydrogel precursor composition, and curing the hydrogel precursor composition to yield the voxel comprising a cured hydrogel, wherein at least a portion of the heater is embedded in the cured hydrogel.

Implementations of the third general aspect may include one or more of the following features.

Curing the hydrogel precursor composition may include irradiating the hydrogel precursor composition with ultraviolet light. The heater may be a surface mount device (SMD) resistor.

In a fourth general aspect, a device includes a multiplicity of voxels, each voxel including a heater coupled to a thermally responsive hydrogel, wherein the multiplicity of voxels are operatively coupled to mimic a hierarchical structure (e.g., a muscle).

In a fifth general aspect, mimicking activity of muscle tissue includes providing an input signal to the heater of the voxel of the second general aspect to initiate the production of heat, and allowing the heat to modify a volume, a shape, or both of the cured hydrogel.

In a sixth general aspect, an actuator includes a plurality of the voxels of the second general aspect, wherein the actuator is configured to bend, twist, elongate, or any combination thereof. Implementations of the sixth general aspect may include one or more of the following features. In some cases, the actuator is configured to bend, twist, and elongate simultaneously, reversibly, or both. In certain cases, the actuator includes a gripper.

In a seventh general aspect, forming the voxel of the second general aspect includes additive manufacturing of the cured hydrogel.

In an eighth general aspect, forming a voxel includes forming a cured hydrogel, laser cutting the cured hydrogel, and coupling a heater to the cured hydrogel to yield the voxel.

A ninth general aspect includes a thermally responsive hydrogel formed by photopolymerizing the hydrogel precursor composition of the first general aspect.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1 depicts fabrication of a soft voxel actuator (SVA).

FIGS. 2A and 2B depict examples of SVA assemblies.

DETAILED DESCRIPTION

Figure 3C:
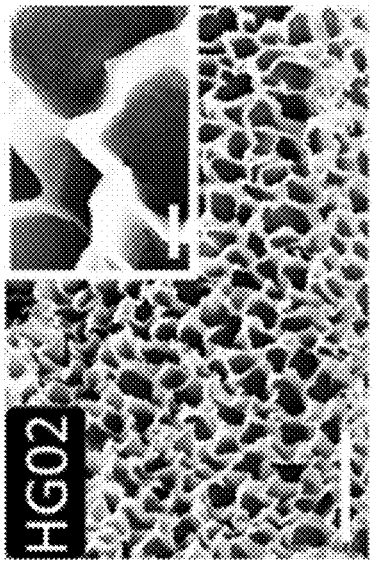
FIGS. 3A-3F are scanning electron microscopy (SEM) images showing the effect of solvent ratios on pore structures of hydrogels.
Figure 3F:
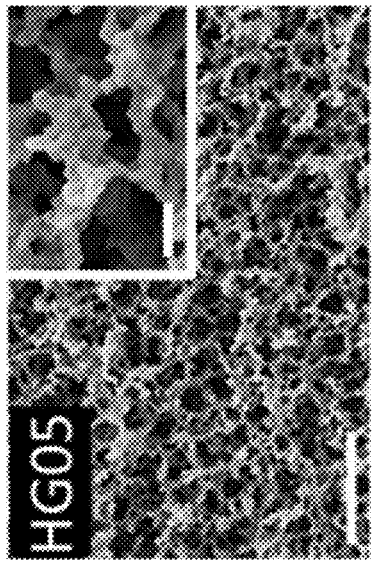
Figure 3B:
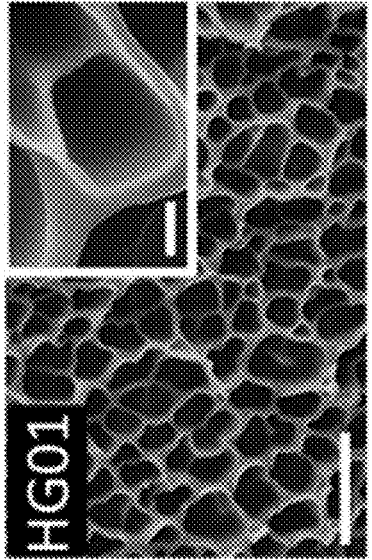
Figure 3E:
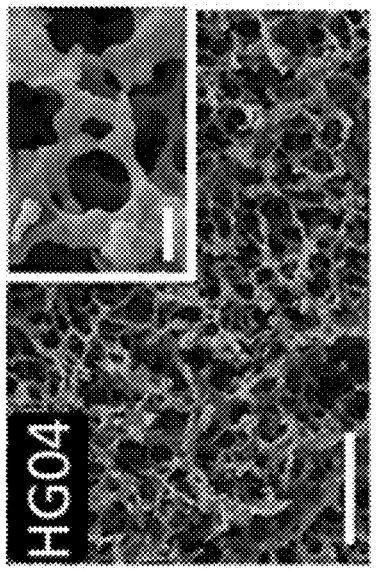
Figure 3A:
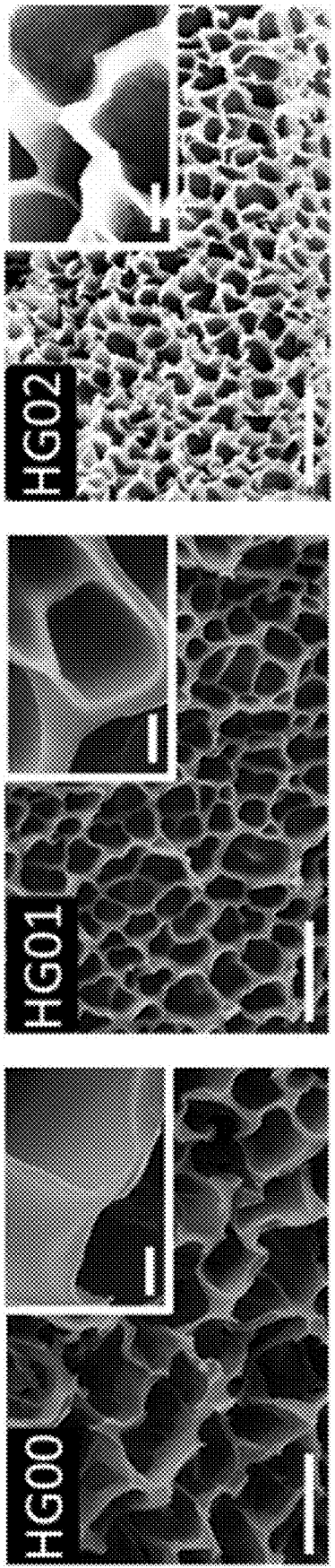
Figure 3D:
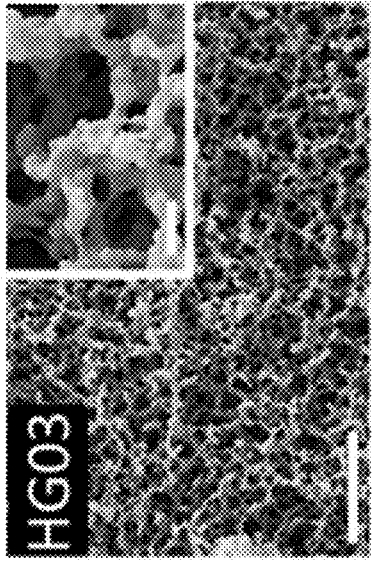

Adaptive properties observed in living materials can be attributed at least in part to hierarchical structure across different length scales. This hierarchy can start at the molecular level and extend to proteins, cells, tissue, and organs. At each level of this hierarchy, certain responsive structures are used, the properties of which can be tuned, thereby contributing to the bulk tunable properties of the tissue. Based on the function and bulk properties expected from an artificial adaptive material, certain levels of hierarchy from biological materials can replicated. This disclosure relates to design strategy, integration and manufacturing, and components for a universal adaptive material for creating various actuation mechanisms.

A hierarchical design strategy based on biological muscle tissue is described, with a goal to mimic biological muscle tissue and facilitate manufacturability. In the case of human muscle tissue, the sarcomere has been identified as a building block that can be reproduced using current technologies. This level of hierarchy is the smallest force generating unit in biological muscle tissue.

Responsive hydrogels are a class of hydrogels that respond to different stimuli such as temperature, pH, light and electric field by changing its volume. This volume change can be harnessed to generate force or motion. In addition, their mechanical properties are close to biological soft tissue. Since the absorption and release of water in hydrogels is a diffusion-based process, the length of the diffusion path becomes is a factor in determining the response time of hydrogels. This length typically depends on the characteristic dimension of the material, with a smaller dimension corresponding to a faster response.

As described herein, thermally responsive hydrogels can be used to create hierarchical designs. Suitable examples of thermally responsive hydrogels are made through a UV photopolymerization process, and are therefore compatible with additive manufacturing techniques like three-dimensional (3D) printing. Moreover, only a small number of ingredients are used in the process, thereby facilitating preparation. The cosolvent composition in the precursor solutions serves as a tuning parameter for enhanced response times.

Hydrogel material prepared as described herein has been modeled in COMSOL finite element software package using models available in the literature. This simulation capability has provided insight into the performance of the structures made using hydrogels and has helped minimize prototyping steps that would otherwise require more trial and error.

Actuating units that mimic the sarcomere in human muscle tissue can be used as a basis for larger and more complex structures. Using selected manufacturing techniques, the size of the artificial actuating units can be reduced without losing the simplicity of the methods. Integration techniques can facilitate the assembly of individual units into larger structures that allows operative coupling of a microcontroller for eventual sensing and control.

Hydrogel soft responsive materials have been prepared to mimic a fascicle. Sample sizes were in the order of few centimeters in each dimension. Global heating was used to induce shape change in the hydrogel. The temperature of the gel was controlled, and forces produced as a result of the temperature changes were measured. Circulating water with a desired temperature was used to control the temperature of the gel, and a force sensor was used to measure the force generated due to change in the volume of the gel. In some cases, a more precise force sensor was used, and temperature was controlled with Peltier devices and a proportional-integral-derivative (PID) controller.

Local heating of the gel was implemented using embedded heaters, analogous to the use of local ATP molecules in the vicinity of actin and myosin filaments in muscle tissue to generate the required energy for those filaments to slide along each other and produce force. In some examples, hydrogel in its polymerized fully swollen form was laser cut as a post-processing step for shaping the gel into structures of interest, and heating elements were added to the structures after the laser cutting step. Resistors such as etched copper coated Kapton and surface mount device (SMD) resistors, compatible with laser cutting manufacturing techniques, were used as joule heating elements.

Robotic mechanisms were developed using the laser cutting manufacturing technique and SMD heaters. In one example, a soft gripper was made using the laser cutting technique. In another example, a starfish podium mimicking device was also made. This device was used to move an acrylic plate placed on top of an array of four podia configured as cantilever beams with SMD heaters on the sides. Cyclic movement of the beams resulted in the displacement of the acrylic plate. A 16 channel MOSFET array was used for individually addressing the SMD heaters. The system includes an Arduino controller, a MOSFET array, and a chamber coupled to the array using custom made flexible circuits.

In another example, a gastropod robot that mimics the locomotion of a snail or worm by creating a traveling wave in the bulk of the hydrogel material was fabricated. This device includes an array of SMD resistors in contact with a pillar made of hydrogel. By activating the heaters in a sequence, a traveling wave is generated which is expected to result in a net displacement in the direction of the waves. By using a 2D array of heaters, 2D motion in a plane as well as linear motion can occur.

Other suitable heaters include nichrome wires, copper wires, and carbon fibers. The heaters can be embedded in the precursor solution and the gel polymerized using UV light. This method can be implemented without additional rigid structures to support the heaters. That is, the hydrogel itself can support the heating elements. The heaters can be placed inside silicon molds, and the hydrogel precursor solution is cured in the mold along with heaters.

The SMD resistors can be integrated into hydrogel. They can be used both in laser cutting methods and UV curing methods. In addition, they can be mounted on flexible circuits made from copper-coated polyimide, which facilitates the connection of actuator units—voxels—to electronics. Electrical insulation of the circuit and the resistor may be applied using a spray coat of soft silicon before embedding into the hydrogel.

The voxels can be used to create soft robotic structures and mechanisms. Specialized manufacturing methods or modification of operations in the process can be used as appropriate. Devices such as grippers, cantilevers, and starfish podia can be fabricated. Bending, twisting, and elongating actuators can also be fabricated. These actuators can be fabricated in different sizes, from millimeters to centimeters. A high number of degrees of freedom in the mentioned actuators can be electronically addressed to yield adaptive actuators. That is, a single actuator can perform bending, twisting, and elongation simultaneously in a reversible manner. Moreover, the use of heaters as a control method allows flexibility.

Voxels made of hydrogel described herein can be used as actuator units to mimic the function of a sarcomere. In some implementations, additive manufacturing can be used to print hydrogel as well as the resistive heating elements (e.g., using conductive ink materials). Thus, sarcomeres, as well as muscle fibers, can be fabricated with additive manufacturing methods, such as 3D printing. Next, by integrating a number of these sarcomeres using scalable manufacturing methods, the function of different levels of hierarchy in a biological muscle, from muscle fibers to the entire muscle tissue, can be mimicked.

Heterogeneous hydrogel structures are formed using temperature-responsive hydrogel physical voxels as building blocks that demonstrate pre-programmed as well as on-demand complex deformations. This has been enabled by an optimized mixed solvent synthesis method that allows mass producing voxels with a wide range of swelling properties in less than 10 s.

FIG. 1 depicts the steps for fabricating voxel 100. Although voxels can have different shapes, voxel 100 is depicted as a rectangular block for simplicity. Fabricating voxel 100 includes providing hydrogel precursor 102 to mold 104. Voxel 100 may be fabricated with or without an embedded heater. Heaters 106 may be ohmic or resistive (Joule) heaters. Hydrogel precursor 102 is polymerized by ultraviolet (UV) radiation to yield hydrogel 108.

Voxels used as building blocks that resemble a group of muscle fibers are referred to as soft voxel actuators (SVAs). SVAs produce a simple, isotropic deformation and can be activated using either environmental or microcontroller generated signals. The deformation rate of the SVAs can be tuned based on an optimized mixed solvent synthesis method. In addition, this synthesis method enables embedding Joule heaters in voxels during polymerization resulting in electrically addressable SVAs.

Voxel 100 that includes heater 106 is referred to as SVA-II 110. Voxel 100 without a heater is referred to as SVA-I 112. SVA-II 110 and SVA-I 112 are made using the same molding and photopolymerization process. However, SVA-II 110 incorporates heater 106 that is embedded inside hydrogel precursor 102 prior to polymerization. Heater 106 may be turned on and off to alter the physical properties of the hydrogel 108. SVA-II 110 produces isotropic deformation across its volume when heater 106 is activated.

Various strategies may be used to create soft structures with biomimetic motions. FIG. 2A depicts assembly 200 including a multiplicity of SVA-IIs 110. Heaters 106 are operated independently in SVAs 110 to change the temperature of selected SVA-IIs 110 and achieve a selected deformation of assembly 200. Local temperature changes are produced by the embedded heaters 106 inside the SVA-IIs allow on-demand programming of deformations using microcontroller generated electrical signals. In one example, as depicted in FIG. 2A, assembly 200 includes segments 202, 204, 206, 208, and 210. Heaters 106 in portions 202' and 202" of segment 202, portion 204" of segment 204, portion 208' of segment 208, and portions 210' and 210" of segment 210 are in an off state. Heaters 106 in portions 204' of segment 204, portions 206' and 206" of segment 206, and portion 208" of segment 208 are in an on state. With heaters 106 in an on state, uniform volume contraction of the corresponding portion is observed. Segment 206, which is uniformly contracted, is referred to as a shortening segment. Heaters in the on state in portions 204' and 208" cause a volume contraction on one side of the segment. Segments 204 and 208, which are nonuniformly contracted, are referred to as bending segments.

FIG. 2B depicts assembly 220 including a multiplicity of SVA-Is 112 (without embedded heaters). Different material properties in segments 222, 224, 226, 228, and 230 allow for creating soft structures with complex deformations in response to a global temperature change to achieve a selected deformation of assembly 220. In one example, as depicted in FIG. 2, assembly 220 includes segments 222, 224, 226, 228, and 220. Portions 222' and 222" of segment 222, portion 224" of segment 224, portion 228' of segment 228, and portions 230' and 230" of segment 230 are made of a first material. Portions 224' of segment 224, portions 226' and 226" of segment 226, and portion 228" of segment 228 are made of a second material. Segment 226 is referred to as a shortening segment. Segments 224 and 228 are referred to as bending segments.

Poly(N-isopropylacrylamide) (PNIPAAm) hydrogels suitable for voxels described herein include a water/DMSO mixed solvent and are photopolymerized with UV radiation. Suitable N-isopropylacrylamide monomer concentrations can range from 10-40 wt %. In one example, a monomer to cross-linker mass ratio is about 20:1. A cosolvent composition in the range of 20-50 vol % water yields optimal swelling behavior in the fabricated hydrogel. In another example, a photoinitiator concentration of 5 μL/mL is sufficient to initiate the photopolymerization. The polymerization time in this method is between 5 seconds and 15 seconds (e.g., about 10 seconds). The entire process of manufacturing a voxel, including weighing monomers and crosslinkers, adding solvents, casting, curing, and demolding, takes less than 10 minutes. Using this method, the response rate, swelling ratio, Young's modulus and force produced by SVAs made of poly(N-isopropylacrylamide) (PNIPAAm) hydrogels can be tuned by merely adjusting the solvent ratio (SR) in a mixed water/DMSO solvent. SR is defined as the volume of water over total volume of mixed solvent. For example, 1000 μL of a mixed solvent with SR=0.3 contains 300 uL of water and the hydrogel produced using this solvent is denoted by HG03.

The effect of solvent ratio (SR) on the hydrogel microstructure was observed using scanning electron microscopy, as seen FIGS. 3A-3F (low magnification scale bars:10 μm; high magnification scale bars: 1 μm). Hydrogels with 6 different SR were synthesized and are represented by a four-character code from HG00 to HG05. These hydrogels are imaged via SEM after drying and sputter-coating with a thin layer of gold. The drying process avoids excessive destruction and modification to the intrinsic wet polymer structure; instantly freezing the hydrogels in liquid nitrogen, then freeze-drying, yielded the most consistent and reproducible imaged pore morphology. Distinct changes in the microstructure were found based on the SR of the prepolymer solution, which can impact a variety of other material properties. By increasing the SR from 0.0 to 0.2, pore size decreases and the pore wall surfaces begin to transition from smooth to rough. At SR=0.2, the microstructure of the gel starts to change from a closed-pore to an open-pore structure.

Figures 4A, 4B, 4C:
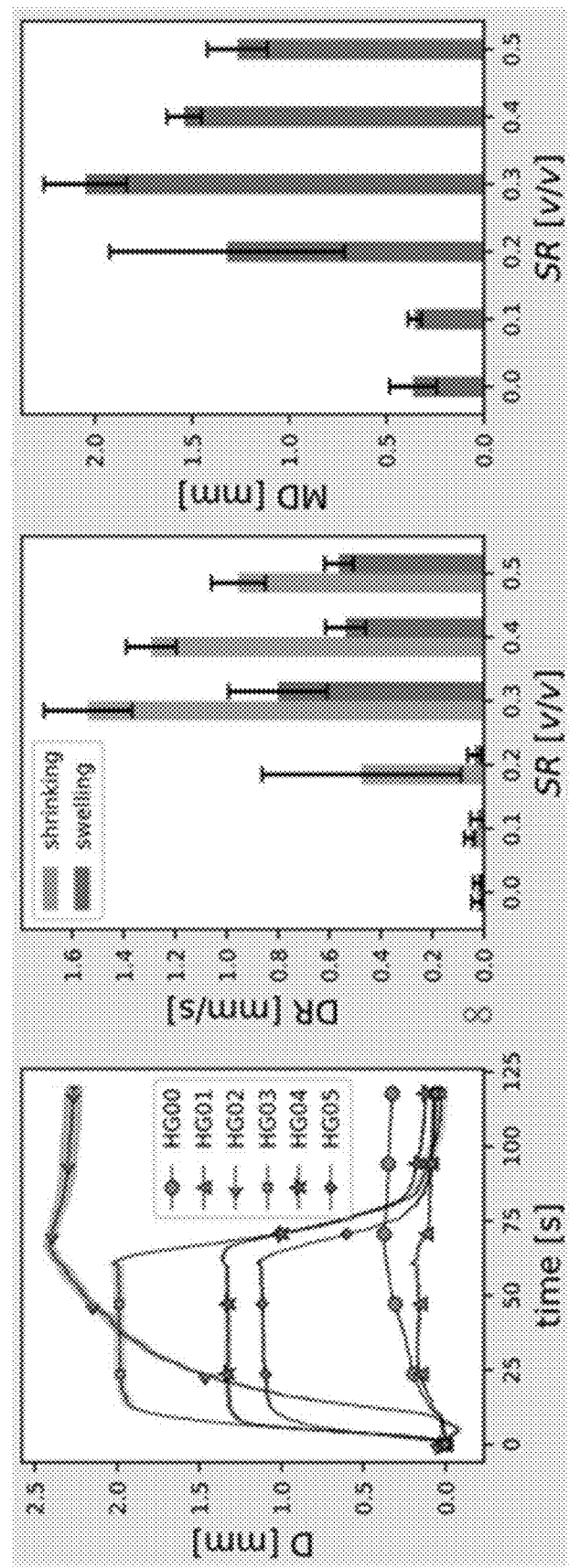
FIGS. 4A-4C show displacement, displacement rate, and maximum displacement, respectively, by SVAs with hydrogels depicted in FIGS. 3A-3F.
Figure 4F:
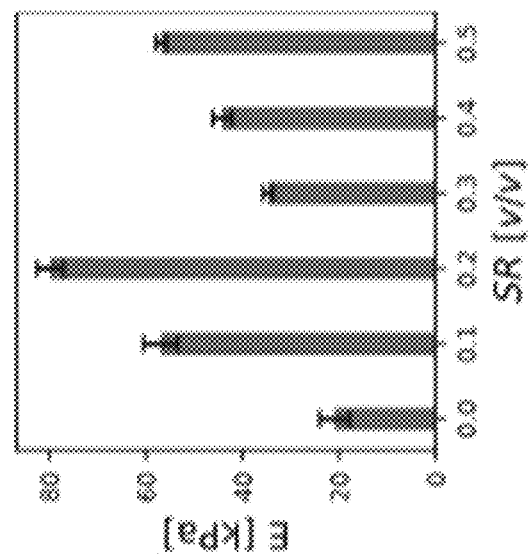
FIG. 4F shows Young's modulus as a function of SR.
Figure 4E:
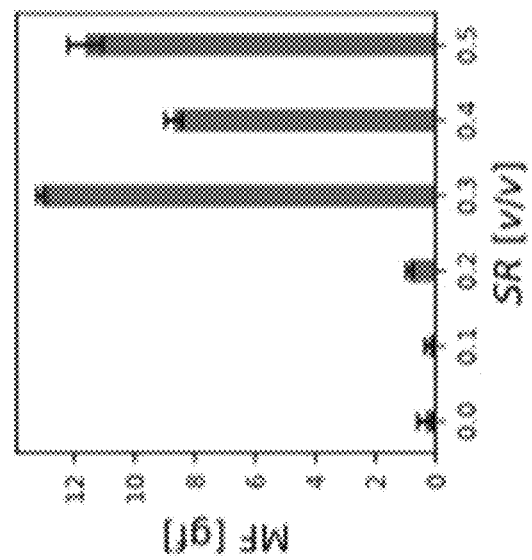
FIG. 4E shows maximum compressive force as a function of SR extracted from FIG. 4D.
Figure 4D:
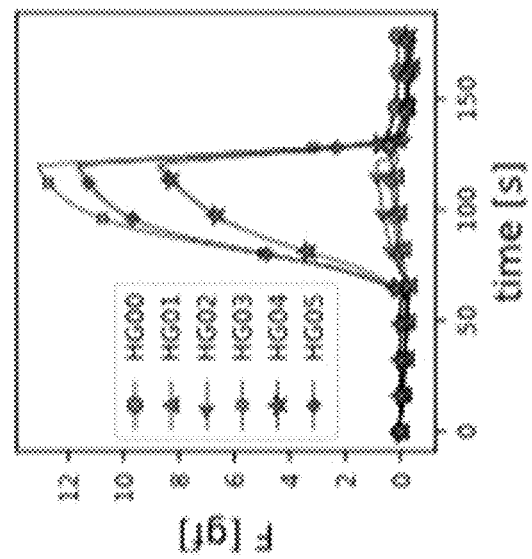
FIG. 4D shows compressive blocked force of a SVA with a heater.

FIG. 4A shows displacement (D) generated by SVAs with hydrogels HG00-HG05 with embedded heaters. FIGS. 4B and 4C show displacement rate (DR) and maximum displacement (MD) as a function of SR (extracted from FIG. 4A). FIG. 4D shows compressive blocked force of a SVA with a heater. FIG. 4E shows maximum compressive force as a function of SR extracted from FIG. 4D. FIG. 4F shows Young's modulus as a function of SR.

The changes in the microstructure of the hydrogel affect the dynamic response of SVAs. Volume changes of hydrogels are characterized by swelling ratio-defined as the volume of the fully swollen gel to that of dry gel- and is measured using a vision-based test setup. The volume changes of a SVA as a function of time—as its embedded heater is turned on for 60 s and then turned off for 60 s—is shown in FIG. 4A. As the SR increases up to 0.2, there is no significant change in volume during heating or cooling. At SR=0.2, the gel starts to shrink substantially as the heater is turned on. However, when the heater is turned off, the gel does not show any swelling during the 60s duration of the experiment.

Two different parameters, namely deformation rate (DR), and maximum displacement (MD) are extracted from FIG. 4A and shown in FIGS. 4B and 4C. A hydrogel made with SR=0.0 is included as a basis for comparison across all tests. For the effect of SR on Young's modulus of the hydrogel and the force generated by the SVAs, they generally increase as the concentration of water in the mixed solvent increases, however there is a sharp discontinuity when the overall structure of the pores changes at a certain threshold water concentration of ~30 vol %, where the Young's modulus drops before increasing again.

Figures 5A, 5B, 5C:
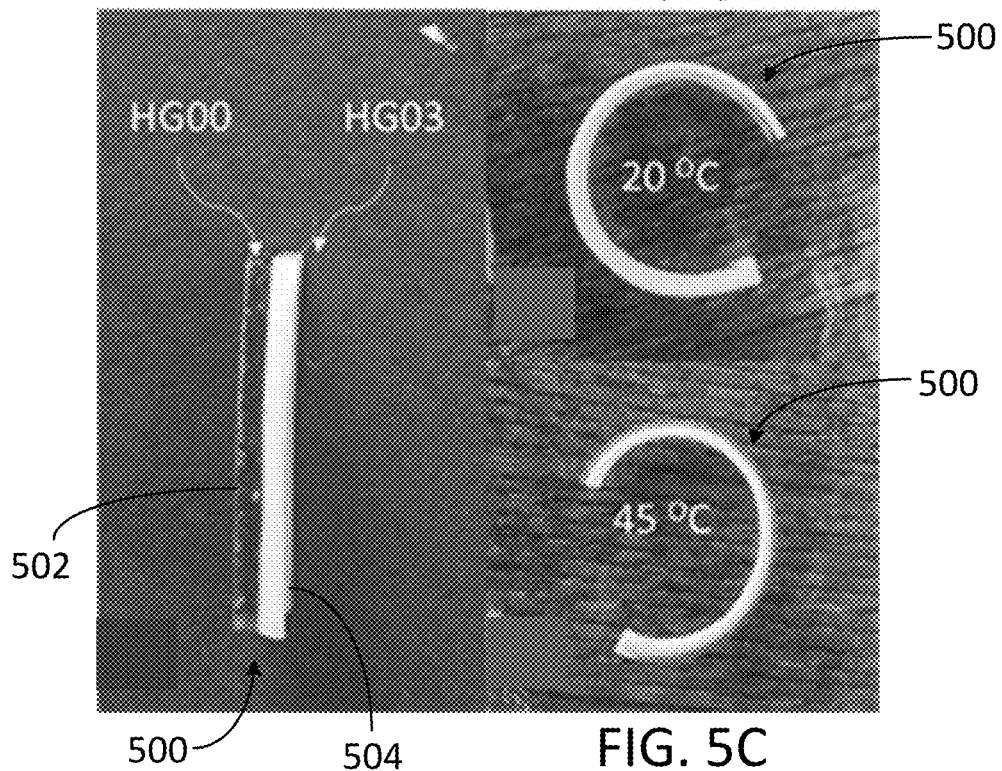
FIG. 5A is an SVA in the form of a bilayer structure.
FIGS. 5B and 5C show bending of the bilayer structure of FIG. 5A.
Figures 6A, 6B, 6C:
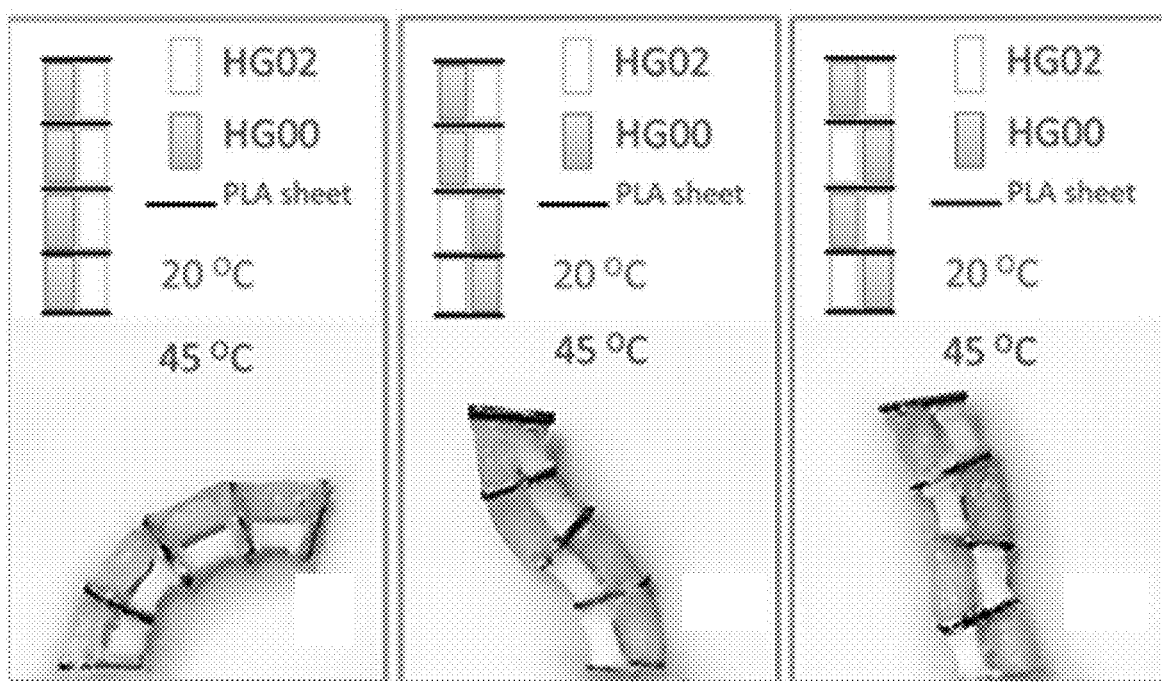
FIGS. 6A-6C show deformation of SVA assemblies.

A wide range of tunable hydrogel properties enables creating heterogeneous structures with more complex functions. FIG. 5A shows bilayer beam 500 with voxel structures 502 and 504 created with hydrogels HG00 and HG03, respectively. Bilayer beam 500 bends to the side as the temperature increases because hydrogel HG03 hydrogel shrinks than hydrogel HG00. FIGS. 5B and 5C show that bilayer structure 500 can bend almost to a circle when the temperature is changed to 20° C. and 45° C., respectively. FIGS. 6A-6C shows how three different voxel arrangements using HG00 and HG02 deform when subjected to a homogeneous temperature change from 20 to 45° C.

Figure 7A:
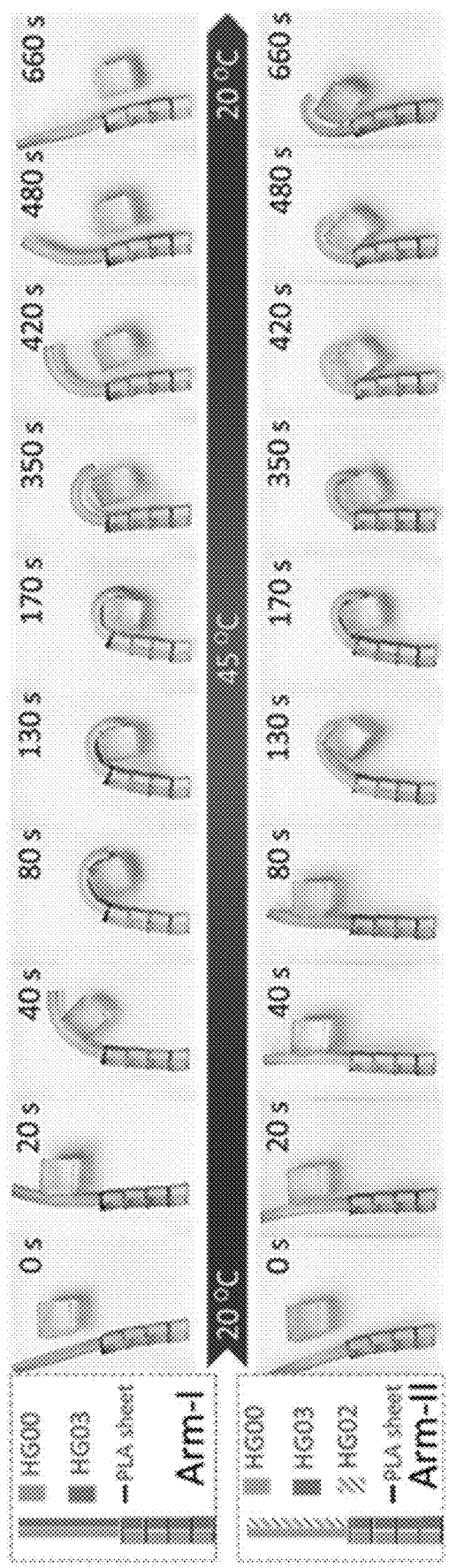
FIG. 7A shows time-lapse images of deformation of SVA assemblies.
Figures 7B, 7C:
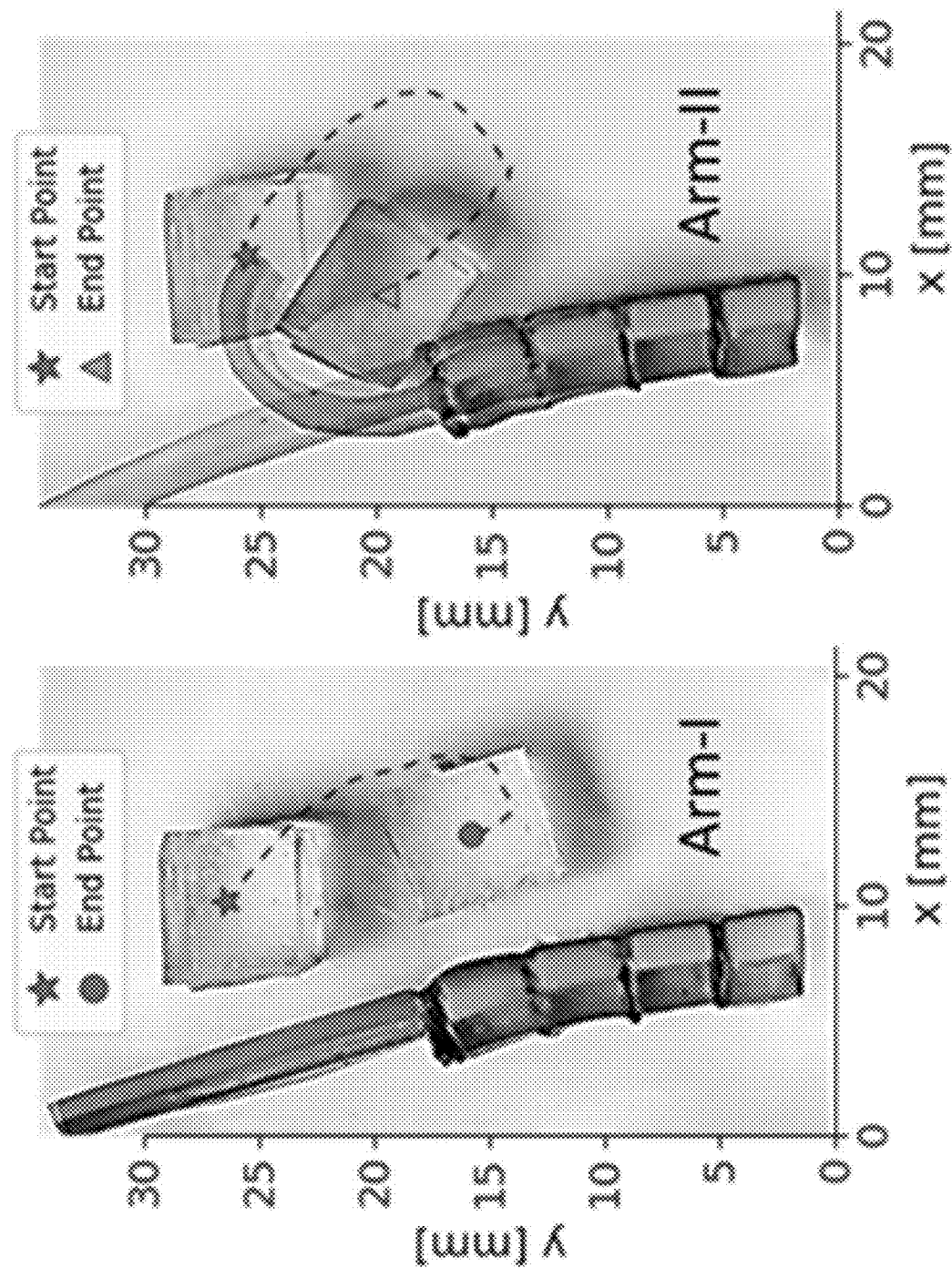
FIGS. 7B and 7C are overlay images showing the starting position, the ending position, and the trajectory of the manipulated objects in FIG. 7A.
Figure 7D:
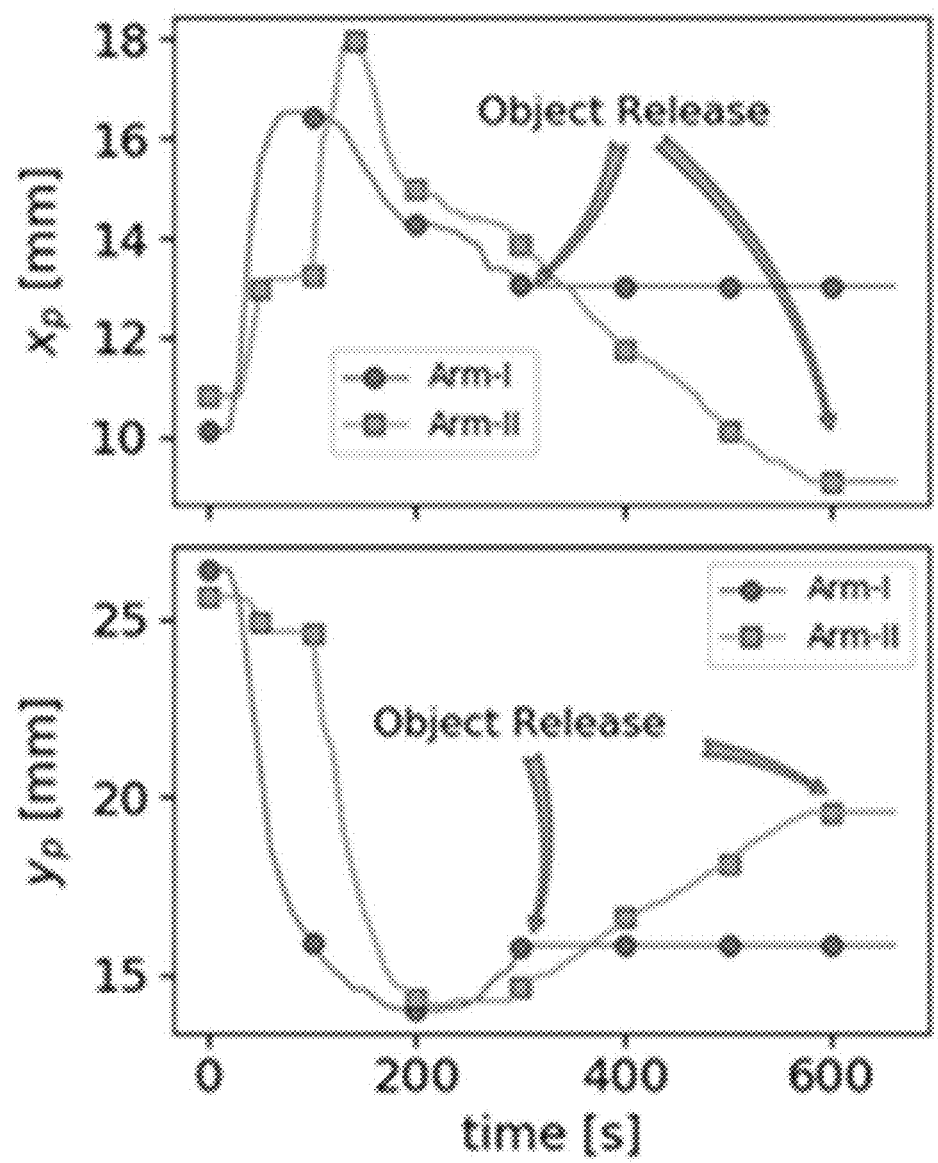
FIG. 7D shows x and y coordinates of the center of the mass of the manipulated objects in FIG. 7A as they are displaced by the assembly.

Other heterogeneous structures using a combination of the bilayer and voxel-based structures are also possible which perform more complex tasks. At this level, the heterogeneous structures are often called soft robots since they can perform functions such as grasping and manipulation. To demonstrate this, soft heterogeneous structures referred to as manipulators are made with a combination of HG00, HG02 and HG03 as shown in FIG. 7A. Two different manipulators—Arm-I and Arm-II—have been constructed which are shown in top and bottom row, respectively, of FIG. 7A. In a global cyclic temperature change from 20 to 45° C. and back to 20° C., time-lapse images from 0 to 660 seconds show that these manipulators can bend towards an object, grasp it by wrapping around it and transport it to another location. Both manipulators have the same heterogeneous structure, except that, the bilayer structure in Arm-I is a combination of HG00/HG03 layers, whereas in Arm-II, it is a combination of HG00/HG02 layers. This minor difference however, causes Arm-I to move the object in a completely different trajectory compared to Arm-II, although the starting location of the object is the same in both experiments, as shown at 0 seconds. Due at least in part to the high swelling rate of HG03 in the bilayer of Arm-I during the cooling phase, the bilayer opens, and the object is released from Arm-I in the early stages of the cooling phase. The bilayer in Arm-II on the other hand, does not open and continues to hold the object during the entire cooling phase because of a significantly lower swelling rate of HG02 layer. FIGS. 7B and 7C are overlay images showing the starting position, the ending position, and the trajectory of the manipulated object in Arm-I and Arm-II, respectively. FIG. 7D shows x and y coordinates of the center of the mass of the object as it is displaced by the manipulator.

While achieving inhomogeneous deformations resulting in useful robotic functions, as discussed above, is possible by simply applying a global temperature change, in some applications, such as underwater exploration, temperatures cannot be globally controlled as easily. In addition, it is not always desirable to encode only one complex motion into a structure. To overcome these limitations, SVAs with embedded heaters may be employed, and a stimulus applied locally through the heaters.

Figure 8A:
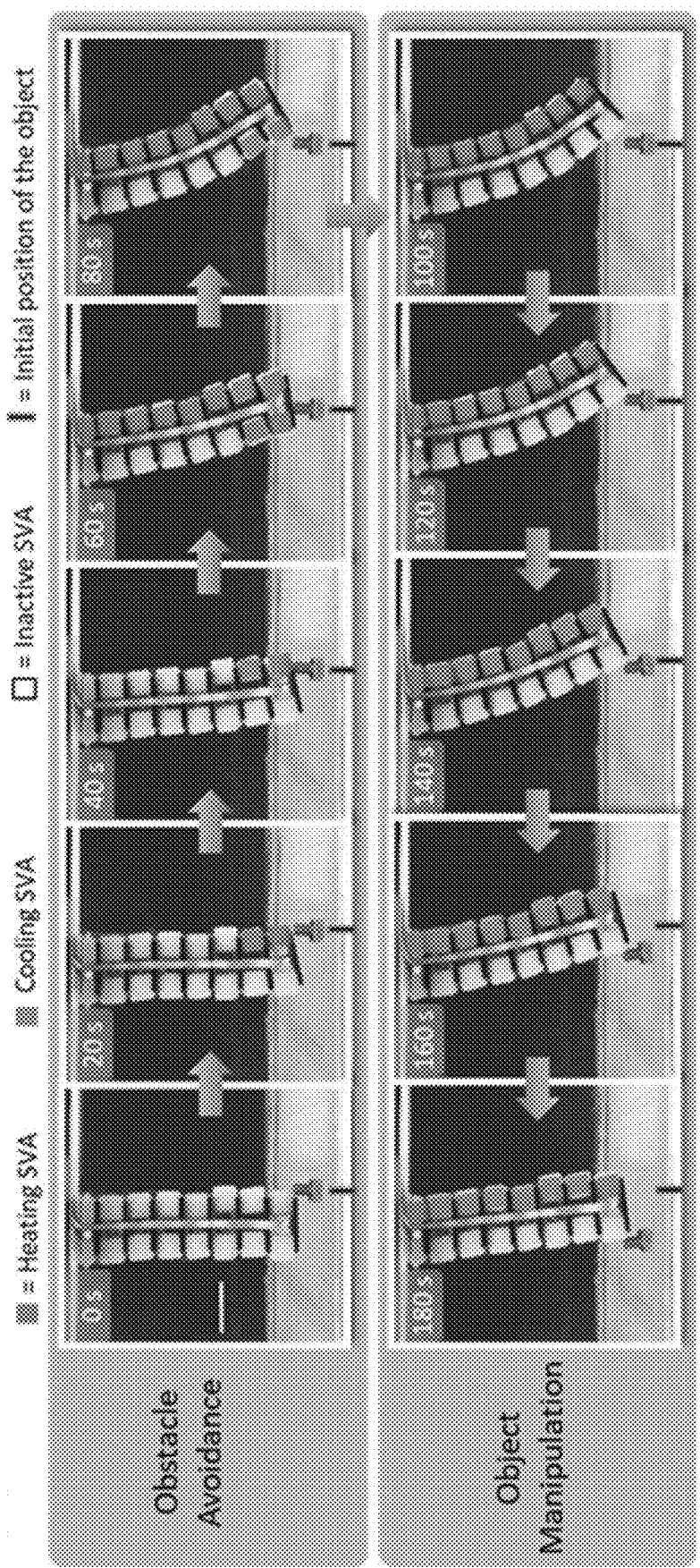
FIG. 8A shows time-lapse images of deformation of an SVA assembly.

The manipulator shown in FIG. 8A was fabricated using 16 SVA-II actuators. These SVAs are made of HG03, which has the highest shrinking and swelling rates. As seen in FIG. 8A, this structure can perform two different tasks assigned to it sequentially without the need to change its voxel arrangement or any other manual interventions. The first task, shown in the top row, is obstacle avoidance in which the structure deforms to maneuver around an object—in this case a screw—placed in its vicinity to avoid collision. Task two is defined as object manipulation where the screw needs to be displaced. Once past the screw, the manipulator switches to task 2 to push the object to the left which is shown in bottom row.

Figure 8B:
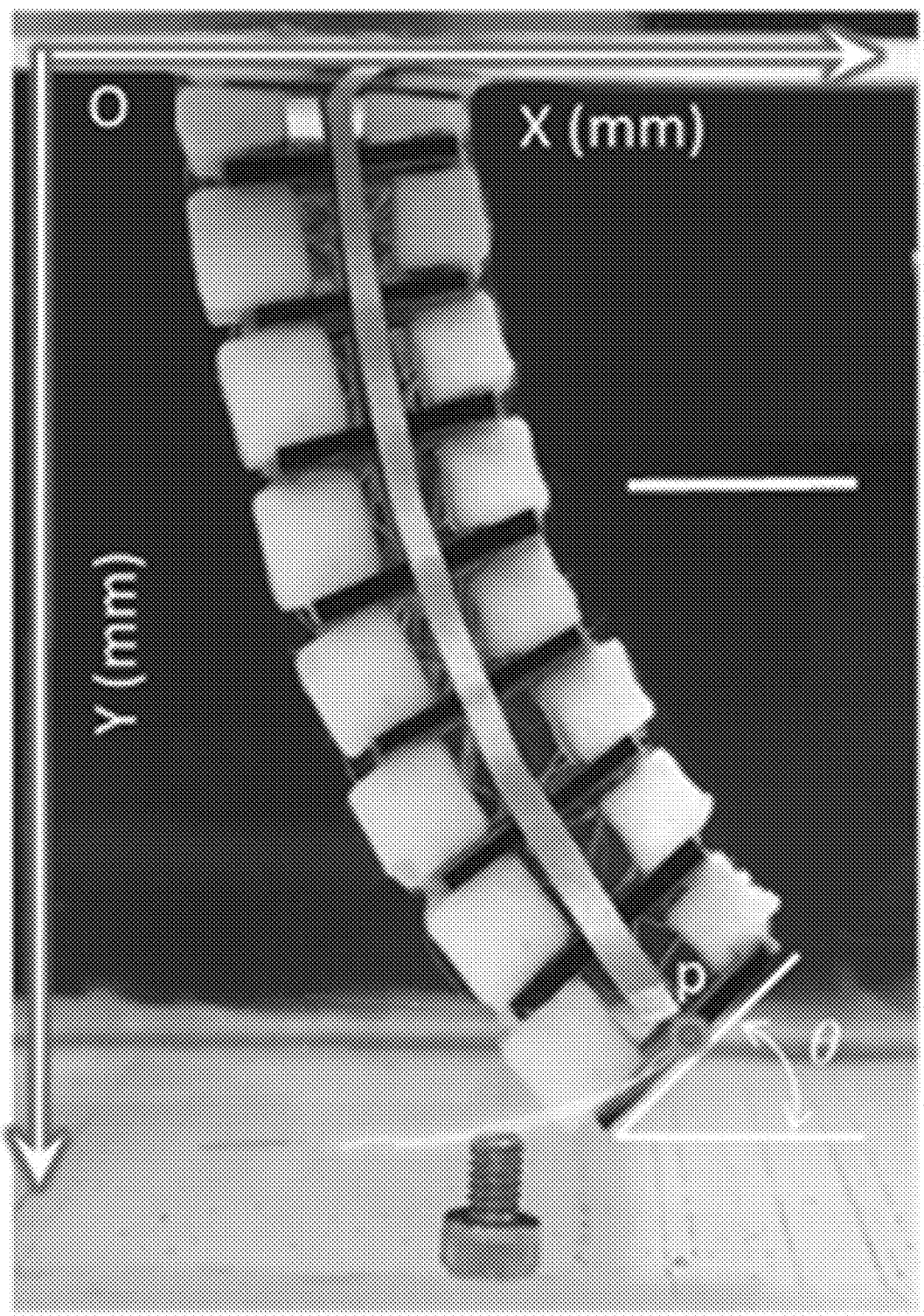
FIG. 8B is an enlarged view of the SVA assembly in FIG. 8A.
Figure 8C:
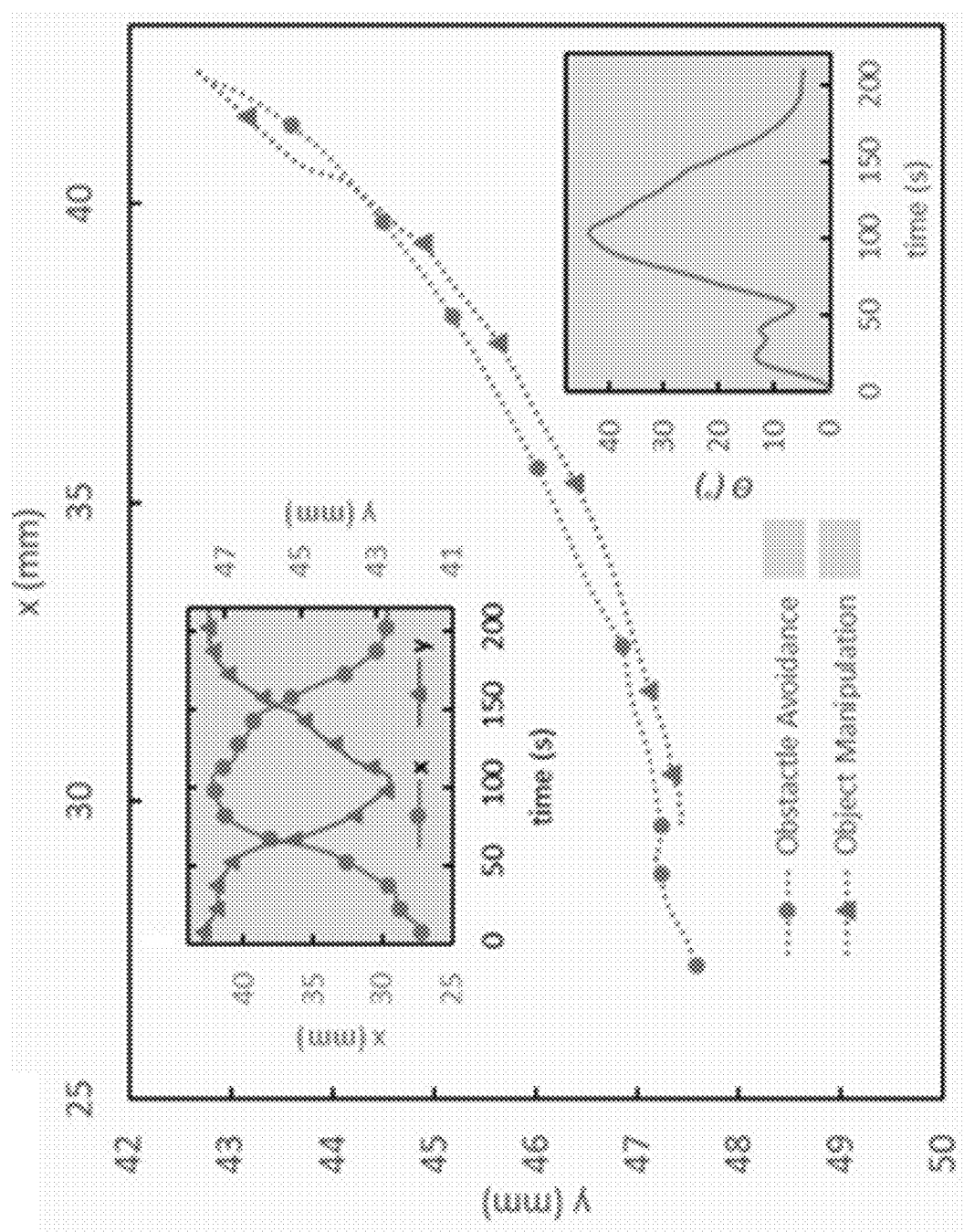
FIG. 8C shows the trajectory followed by a point on the SVA assembly in FIG. 8A. Insets in FIG. 8C show time-based plots of the x and y coordinates of this point and an end plate of the SVA assembly.

Each task requires a different trajectory to be followed by the tip of the manipulator denoted by point p in the coordinate system O in FIG. 8B. These trajectories, which are shown in FIG. 8C, vary only slightly and the manipulator should be capable of performing precise movements in order to follow such trajectories. The top inset in FIG. 8C shows the x and y coordinates of the point p, and the bottom inset shows the angle of the end plate θ, indicating that both these parameters are complex functions of time. In contrast, we have used electrical signals which are generated and controlled by a microcontroller.

Figure 9:
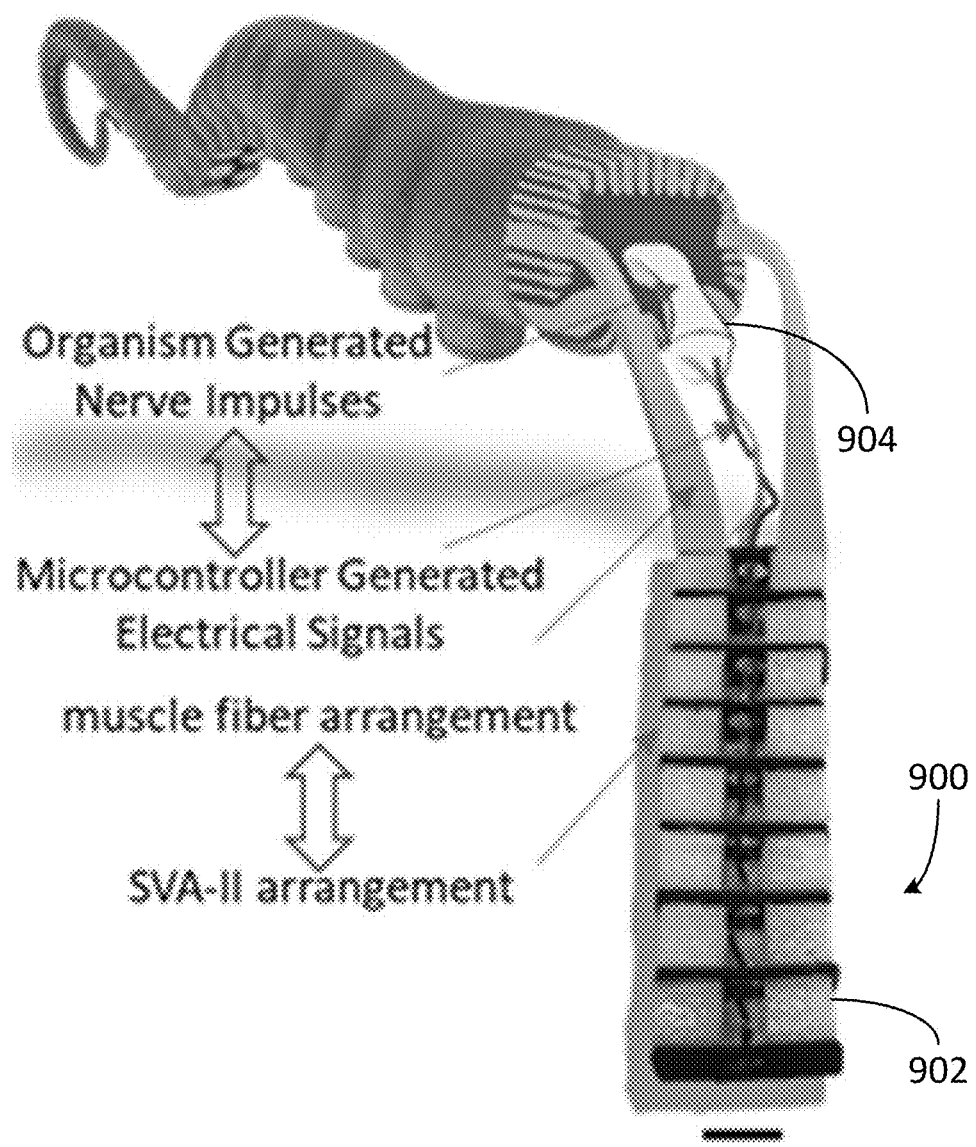
FIG. 9 shows an analogy between the electrical stimulation and arrangement of SVAs to the electrical stimulation of muscle fibers and their arrangement in biology using an octopus arm as an example.

FIG. 9 illustrates an analogy between the electrical stimulation and arrangement of SVA-IIs to the electrical stimulation of muscle fibers and their arrangement in biology using octopus arm as an example. Assembly 900 includes SVA-IIs 902 electrically coupled to controller 904. Controller 904 is configured to generate electrical signals to selectively and independently heat SVA-IIs 902 to control movement of assembly 900.

EXAMPLES

Preparation of fast responsive hydrogel: 40 wt % N-isopropylacrylamide (NIPAM) and 2 wt % N,N'-methylenebisacrylamide (bis) were dissolved 30 vol % mixtures of water in DMSO. 5 µL/mL of 2-Hydroxy-2-methylpropiophenone (Sigma Aldrich) was used as photo initiator. At the time of molding and before curing, water was added to the solution with the desired ratio and mixed thoroughly. The amount of water was varied as $1/15$, $2/15$, and $3/15$ of the volume of the whole mixture for studying the effect of amount of water on swelling ratio and response time. For example, if the volume of the entire mixture was 15 microliters, 3 microliters of water was added to 12 microliters of precursor solution.

Preparation of the voxels: The monomer solution prepared was poured into molds made of PDMS (Silgard). The heaters were placed inside the molds using manual positioning stages such that the solution covers them completely. The solution was then cured under UV light (365-400 nm).

Measurement of the elastic modulus of the hydrogel (including stress-strain curves): A linear stage (BBD201, Thorlabs, New Jersey) will be used along with appropriate force sensors to measure the force displacement curves for the material at hand.

Measurement of the swelling rate: For comparison of the swelling rate of different materials, image processing techniques that can track hydrogel surface area in real-time can be used. The rate of change in surface area can be used as a measure of swelling/deswelling rate.

Measurement of the displacement of hydrogel structures: Image processing can be used for tracking the position of certain desired spots on the hydrogel structure. This allows implementation of a closed loop controller which can, for example, create a desired trajectory of the tip of a cantilever beam.

Finite Element Modeling (FEM): COMSOL multiphysics package was used for simulating the behavior of hydrogel material based on theory that was implemented by X. Wang, Z. Zhai, Y. Chen, and H. Jiang, "A facile, robust and versatile finite element implementation to study the time-dependent behaviors of responsive gels," *Extrem. Mech. Lett.*, vol. 22, pp. 89-97, 2018. The gel is modeled as a hyperelastic material with normalized nominal free energy density $\hat{W}$ (F, µ) given by Eq. (1):

$$\hat{W}(F, \mu) = \frac{1}{2}Nv[F_{ik}F_{ik} - 3 - 2\log(\det F)] - \left[(\det F - 1)\log\left(\frac{\det F}{\det F - 1}\right) + \frac{\chi}{\det F - 1}\right] - \mu(\det F - 1)$$

Deformation gradient F=∂x(X,t)/∂X is used to map between the reference state (with coordinate X) and the current state (with coordinate x(X, t)) where Nv and χ are two dimensionless materials properties representing the dimensionless shear modulus of the dry polymer and the enthalpy of mixing, respectively. µ is the chemical potential of the gel, with µ=−∞ for a dry polymer and µ=0 for a fully swollen or saturated gel. This theory uses the analogy between mass diffusion and heat transfer.

For diffusion, the conservation of mass can be expressed in terms of deformation gradient F given by Eq. (2):

$$\frac{1}{\det F}\frac{\partial[\det F - 1]}{\partial t} + \frac{\partial\left[-\frac{[\det F - 1]D}{\det F}\frac{\partial \mu}{\partial x_i}\right]}{\partial x_i}$$

where t is time and D is the intrinsic diffusivity. Two types of boundary conditions can be prescribed for the mass diffusion, i.e., prescribed chemical potential boundary conditions µ=µ̄ (i.e., Dirichlet boundary conditions), and prescribed flux boundary condition $$\frac{\partial \mu}{\partial x_i} = \bar{J}_i$$

Neumann boundary conditions). Eqs. (1) and (2) co-evolve the deformation field (i.e., F) and the chemical potential field (i.e., µ).

As an example, this modeling has been verified with the experiments in the case of a voxel with a SMD resistor embedded inside. The deformation of the voxel is more at the center of each side of the cube and less in the corner. As time passes, the cube shrinks to a final shape and the deformation field becomes substantially uniform across the cube.

Cantilever beams made of hydrogel have been analyzed to study their deformation under excitation with SMD resistors to demonstrate the input signal to the heaters that can cause a desired deformation in these cantilevers. In some cases, the desired deformation is the trajectory of the tip of the cantilever. These simulations suggest that the FEM could been effectively used as a tool to guide the design of the hydrogel structures. A change in geometry can increase the rate and amplitude of the response. In addition, a trajectory that the tip follows can be controlled by turning on and off different heaters at different times.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A voxel comprising:
   a hydrogel formed from a hydrogel precursor composition; and
   a heater embedded in the cured hydrogel,
   wherein the hydrogen precursor composition comprises:
   10 wt % to 40 wt % N-isopropylacrylamide;
   0.5 wt % to 2 wt % N,N'-methylenebisacrylamide;
   a solvent; and
   a photoinitiator,
   wherein the hydrogel precursor composition is photocurable and thermally responsive.

2. A method of fabricating a voxel, the method comprising:
   providing a hydrogel precursor composition to a mold configured to receive a fluid;
   positioning a heater in the hydrogel precursor composition; and
   curing the hydrogel precursor composition to yield the voxel comprising a cured hydrogel, wherein at least a portion of the heater is embedded in the cured hydrogel, wherein the hydrogen precursor composition comprises:
   10 wt % to 40 wt % N-isopropylacrylamide;
   0.5 wt % to 2 wt % N,N'-methylenebisacrylamide;
   a solvent; and
   a photoinitiator,
   wherein the hydrogel precursor composition is photocurable and thermally responsive.

3. The method of claim 2, wherein curing the hydrogel precursor composition comprises irradiating the hydrogel precursor composition with ultraviolet light.

4. The method of claim 2, wherein the heater is a surface mount device (SMD) resistor.

5. A device comprising:
   a multiplicity of voxels, each voxel comprising a heater coupled to a thermally responsive hydrogel, wherein the multiplicity of voxels are operatively coupled to mimic a hierarchical structure.

6. The device of claim 5, wherein the hierarchical structure is a muscle.

7. A method of mimicking activity of muscle tissue, the method comprising:
   providing an input signal to the heater of the voxel of claim 1 to initiate the production of heat; and
   allowing the heat to modify a volume, a shape, or both of the cured hydrogel.

8. An actuator comprising a plurality of the voxels of claim 1, wherein the actuator is configured to bend, twist, elongate, or any combination thereof.

9. The actuator of claim 8, wherein the actuator is configured to bend, twist, and elongate simultaneously.

10. The actuator of claim 9, wherein the actuator is configured to bend, twist, and elongate reversibly.

11. The actuator of claim 8, wherein the actuator comprises a gripper.

12. A method of forming the voxel of claim 1, wherein the method comprises additive manufacturing of the cured hydrogel.

13. A method of forming a voxel, the method comprising:
   forming a cured hydrogel;
   laser cutting the cured hydrogel; and
   coupling a heater to the cured hydrogel to yield the voxel.

* * * * *